United States Patent Office 3,714,164
Patented Jan. 30, 1973

3,714,164
PROCESS FOR THE MANUFACTURE OF
TETRACHLOROPYRIMIDINE
Guido Steffan, Leverkusen, Germany, assignor to Farbenfabriken Bayer Aktiengesellschaft, Leverkusen, Germany
No Drawing. Filed July 1, 1970, Ser. No. 51,728
Claims priority, application Germany, July 3, 1969,
P 19 33 784.9
Int. Cl. C07d 51/36
U.S. Cl. 260—251 R
4 Claims

ABSTRACT OF THE DISCLOSURE

Process for the manufacture of tetrachloropyrimidine by the action of chlorinating agents on barbituric acid, characterised in that barbituric acid is reacted in phosphorus oxychloride, in the absence of water, with approximately 2.9 to 3.5 mols of phosphorus trichloride per mol of barbituric acid and approximately 4.0 to 5.0 mols of chlorine, with warming, preferably in the presence of a catalyst, to give tetrachloropyrimidine. Suitable catalysts are tertiary amines and acid amides. The new process gives considerably higher yields than the known processes. Tetrachloropyrimidine is an intermediate for the production of reactive dyestuffs.

---

Tetrachloropyrimidine can be manufactured according to the process of Swiss patent specification 373,045 by reaction of 5-chlorobarbituric acid with chlorides of phosphorus, such as phosphorus trichloride, phosphorus pentachloride and especially phosphorus oxychloride in the presence of tertiary amines, for example dimethylaniline or diethylaniline. The requisite 5-chlorobarbituric acid is manufactured according to the instructions of this patent specification by chlorination of barbituric acid in aqueous solution. Before further processing to tetrachloropyrimidine the 5-chlorobarbituric acid is isolated and dried. The tetrachloropyrimidine finally obtained is worked up in an aqueous system. The yield, relative to barbituric acid, is 72% of theory.

The method indicated by Childress and McKee (J. Am. Chem. Soc. 72, 4271 (1950)) for the manufacture of tetrachloropyrimidine from barbituric acid with phosphorus pentachloride and phosphorus oxychloride is rejected in Swiss patent specification 373,045 as being uneconomical because of the lower yield. Other processes known from the literature are of no interest for industrial exploitation.

The process of Swiss patent specification 373,045 however also still suffers from disadvantages. Apart from the yield, which is not fully satisfactory for a large-scale industrial process, the working-up of the reaction mixture containing tetrachloropyrimidine in an aqueous system is physiologically hazardous and can therefore only be carried out under special precautionary measures. Here the effluent problem also plays a role of constantly increasing importance. If an anhydrous tetrachloropyrimidine is required for further reactions, an expensive dehydration cannot be avoided. In addition, a far greater than catalytic amount of the tertiary amine (about 0.5 mol per mol of 5-chlorobarbituric acid) is required for carrying out the process described in the Swiss patent specification. The requisite 5-chlorobarbituric acid must be manufactured and isolated in a separate process stage.

In contrast to all hitherto known processes, it has now been found that tetrachloropyrimidine can be manufactured in an industrially simplified manner, with significantly better yield and avoiding further industrial disadvantages, especially on working-up, if barbituric acid in phosphorus oxychloride is reacted in the absence of water with about 2.9 to 3.5 mols of phosphorus trichloride per mol of barbituric acid and chlorine in an amount of approximately 4 to 5 mols per mol of barbituric acid with warming, preferably in the presence of a catalyst.

The reaction according to the invention can be carried out in the presence or absence of catalysts; preferably, a catalyst or a mixture of catalysts is employed; an addition of catalyst reduces the reaction time and improves the yield and purity of the product.

Suitable catalysts for the reaction are tertiary amines such as trialkylamines having 1–4 carbon atoms in the alkyl group or preferably heterocyclic amines such as pyridine, alkylpyridines with 1–4 carbon atoms in the alkyl group, quinoline, isoquinoline, 1-alkylimidazoles, N-alkylbenzimidazoles, thiazoles, further N,N,N',N'-tetraalkyl, alkylene diamines, N-alkylpyrrolidines, N-alkylmorpholines, N-alkylpiperazines as well as acid amides such as dimethylformamide and their mixtures. It suffices to use these substances in catalytic amounts only. The reaction takes place particularly advantageously if phosphorus trichloride is employed in approximately stoichiometric amount, that is to say approximately 3.0 to 3.1 mols per mol of barbituric acid.

An important characteristic of the process is the use of excess chlorine in an amount of 4 to 5 mols per mol of barbituric acid. By means of the excess chlorine, undesired side-reactions are repressed or eliminated and the purity of the process products is thereby increased. The advantageous increase and the purity of the product which is thus achieved is not coupled with a reduction in the yield through excessive chlorination of the barbituric acid. Only the use of more than 5 mols of chlorine per mol of barbituric acid, and hence the uptake of more than two chlorine atoms per barbituric acid molecule, before the substitution of the three hydroxyl groups by chlorine leads to less good yields of tetrachloropyrimidine.

In detail, the process according to the invention can be carried out by a total of about 4 to 5 mols of chlorine per mol of barbituric acid being introduced, in the absence of water, at temperatures of room temperature or slightly below up to the boiling point of the mixture, preferably at temperatures not exceeding 80° C., into a suspension of barbituric acid in phosphorus oxychloride and about 2.9 to 3.5 mols, preferably 3.0 to 3.1 mols, of phosphorus trichloride per mol of barbituric acid, in the presence of a catalyst. Thereafter the mixture is brought to, or kept at, reflux temperature until the evolution of hydrogen chloride has ceased.

The reaction can also be carried out by introducing chlorine, under otherwise identical reaction conditions, at temperatures between room temperature or slightly below up to the boiling point of mixture, preferably at temperatures not exceeding 50° C., until 3 to 4 mols of chlorine per mol of barbituric acid have been taken up. The mixture is then warmed until the evolution of hydrogen chloride has ceased, during which a temperature of 80° C. should not be exceeded. After cooling to temperatures between room temperature or temperatures slightly below this and about 60° C., the introduction of chlorine is continued until a total of 4 to 5 mols, but not more than 5 mols, of chlorine per mol of barbituric acid have been taken up. The reaction mixture is subsequently brought to reflux temperature.

The process can also be varied in that firstly a suspension of barbituric acid in phosphorus oxychloride is reacted in the absence of water, preferably in the presence of a catalytic amount of phosphorus trichloride, with about 1 to 2 mols of chlorine per mol of barbituric acid whilst warming, preferably to 40–60° C. and that subsequently, without working-up or isolation and preferably in the same vessel, reaction is carried out with 2.9 to 3.5, preferably about 3.0 to 3.1, mols of phosphorus trichloride per mol of barbituric acid and about 3 to 4 mols, in total not more than 5 mols, of chlorine per mol of barbituric acid, in the presence of the above-mentioned catalysts, at temperatures between room temperature or slightly below and the boiling point of the mixture, preferably at temperatures not exceeding 80° C., and that thereafter the mixture is brought to, or kept at, reflux temperature until the evolution of hydrogen chloride has ceased.

The far-reaching exclusion of water is important for the optimum course of the process according to the invention since otherwise the yield and purity of the process products are considerably impaired; traces of water in the starting materials can be compensated by appropriate metering-in of phosphorus trichloride and chlorine.

The reaction product of the process according to the invention can be worked-up extremely simply, for example by first distilling off phosphorus oxychloride and subsequently obtaining pure tetrachloropyrimidine from the residue by distillation. Thereafter only a slight viscous distillation residue remains, which is for example miscible with ethylene chloride. The phosphorus oxychloride which has been distilled off can be used for further reactions.

Since the tetrachloropyrimidine is already produced in very good purity in the reaction mixture, the total residue after distilling off phosphorus oxychloride can also be used directly, that is to say without prior distillation of the tetrachloropyrimidine, for further reactions.

The yields of distilled tetrachloropyrimidine are between 87 and 96% of theory relative to barbituric acid.

The process according to the invention accordingly offers several advantages relative to the industrially interesting and hitherto utilised process. The yield of the new process is significantly higher. The desired process product, tetrachloropyrimidine, can be obtained from the reaction mixture in a pure, distilled form in an industrially extremely simple manner. The non-aqueous working-up in a closed apparatus is physiologically less hazardous; effluent problems no longer exist. Finally, the process can, in all embodiments, be carried out in one process stage without the hitherto compulsorily necessary isolation of 5-chlorobarbituric acid. This results in a significant simplification and cheapening of the manufacture of tetrachloropyrimidine.

Tetrachloropyrimidine is known as an important intermediate (reactive component) for the manufacture of reactive dyestuffs (for example British patent specification 902,618) and as a starting product for the manufacture of the further important reactive component trifluoro-monochloropyrimidine (French patent specification 1,546,305).

In addition, tetrachloropyrimidine is used as a fungicidal and sporicidal agent (U.S. patent specification 3,227,612).

EXAMPLE 1

170 g. of chlorine (2.4 mols) are introduced into a mixture of 770 ml. of phosphorus oxychloride (8.4 mols), 8 g. of phosphorus trichloride (0.06 mol) and 256 g. of birbituric acid (2 mols) at about 50 to 55° C. in such a way that practically no chlorine is contained in the HCl gas which issues. 840 g. of phosphorus trichloride (6.1 mols) and 3 g. (0.04 mol) of pyridine are then added at 20° C. and 440 g. of chlorine (6.2 mols) are passed in at 20–30° C. with slight cooling, in such a way that no chlorine escapes via a guard dip-tube (for example a wash-bottle filled with paraffin oil). Thereafter the mixture is warmed; a stronger evolution of HCl starts at about 40° C. The mixture is further heated, whilst passing in a very weak stream of chlorine, until the reflux temperature (110–115° C.) has been reached; in the course of this, the evolution of HCl should not become too strong. After completion of the HCl evolution the mixture is kept under reflux for a further hour. For working-up, phosphorus oxychloride is distilled off, finally in vacuo, in the course of which traces of phosphorus pentachloride are occasionally also evolved. The residue is fractionated in vacuo. The 2,4,5,6-tetrachloropyrimidine distils at 10 mm. Hg at 108–109° C. and solidifies in the receiver to give colourless crystals having a melting point of 67–68° C. Yield: 419 g. of tetrachloropyrimidine =96% of theory.

EXAMPLE 2

340 g. of chlorine (4.8 mols) are passed into a mixture of 450 ml. of phosphorus oxychloride (4.9 mols), 192 g. of barbituric acid (1.5 mols), 640 g. of phosphorus trichloride (4.65 mols) and 3 g. (0.04 mol) of pyridine, as in Example 1. The mixture is slowly heated to 65° C. with good stirring and kept at 65–70° C. until the evolution of HCl has subsided (about 1.5 hours). A further 190 g. of chlorine (2.7 mols) are then introduced at room temperature as in Example 1. Thereafter the mixture is slowly warmed to reflux temperature as in Example 1 and after completion of the evolution of HCl is kept for 2 hours at the reflux temperature. After working-up as in Example 1, 305 g. of distilled tetrachloropyrimidine having a melting point of 66–68° C. are obtained. Yield: 93% of theory.

EXAMPLE 3

380 g. (5.35 mols) of chlorine are introduced into a mixture of 620 ml. of phosphorus oxychloride (6.75 mols), 208 g. of barbituric acid (1.63 mols), 700 g. of phosphorus trichloride (5.08 mols) and 4 g. (0.05 mol) of pyridine, as in Example 1. The mixture is now warmed in such a way that the evolution of HCl does not become too strong; at the same time a total of 190 g. of chlorine (2.7 mols) are introduced at between 50 and 70° C. in such a way that practically the entire chlorine is taken up and only little can be detected in the issuing gas. Thereafter the reaction is completed as in Example 1 and the mixture is worked-up by distillation as described there. 322 g. of distilled tetrachloropyrimidine having a melting point of 66–68° C. are obtained. Yield: 91% of theory.

EXAMPLE 4

516 g. of chlorine (7.3 mols) are introduced into a mixture of 620 ml. of phosphorus oxychloride (6.75 mols), 208 g. of barbituric acid (1.63 mols), 670 g. of phosphorus trichloride (4.9 mols) and 4 g. (0.05 mol) of pyridine at temperatures between 50 and 80° C. in such a way that practically no chlorine escapes in the issuing gas. Thereafter the mixture is heated to reflux temperature whilst passing very little chlorine through it, kept at this temperature for a further hour after completion of the evolution of HCl, and then worked-up as in Example 1. 308 g. of distilled tetrachloropyrimidine having a melting point of 66–68° C. are obtained. Yield: 87% of theory.

EXAMPLE 5

175 g. of chlorine (2.5 mols) are introduced into a mixture of 650 ml. of phosphorus oxychloride (7.1 mols), 8 g. of phosphorus trichloride (0.06 mol) and 256 g. of barbituric acid (2 mols) at about 50–55° C. in such a way that practically no chlorine is present in the issuing gas. 840 g. of phosphorus trichloride (6.1 mols) and 4 g. (0.05 mol) of pyridine are then added and a total of 455 g. of chlorine (6.4 mols) is introduced at temperatures between 50 and 90° C. in such a way that only very little chlorine is present in the issuing HCl gas. Thereafter the mixture is slowly warmed to reflux temperature, kept at this temperature for a further hour after the evolution of HCl has ceased, and then worked-up as in Example 1. 393 g. of distilled tetrachloropyrimidine of melting point 66–68° C. are obtained. Yield 90% of theory.

EXAMPLE 6

90 g. of chlorine (1.27 mols) are introduced at about 50–55° C. into a mixture of 218 g. of barbituric acid (1 mol), 385 ml. of phosphorus oxychloride (4.2 mols) and 8 g. of phosphorus trichloride (0.06 mol). 420 g. of phosphorus trichloride (3.05 mols) are then added and 230 g. of chlorine (3.2 mols) are introduced at room temperature as in Example 1. After adding 2 g. of dimethylformamide (0.03 mol) the mixture is gradually heated up to its reflux temperature. When the evolution of HCl has ceased, the mixture is kept at the reflux temperature for a further hour and is then worked-up as in Example 1. 193 g. of distilled tetrachloropyrimidine of melting point 65–67° C. are obtained. Yield: 88% of theory.

EXAMPLE 7

The mix and execution of this example of an embodiment correspond exactly to Example 1 except that 5 g. (0.04 mol) of quinoline are used in place of 3 g. of pyridine.

410 g. of distilled tetrachloropyrimidine of melting point 66–68° C. are obtained. Yield: 94% of theory.

EXAMPLE 8

170 g. of chlorine (2.4 mols) are introduced at about 50–55° C. into a mixture of 700 ml. of phosphorus oxychloride (7.6 moles), 8 g. of phosphorus trichloride (0.06 mol) and 256 g. of barbituric acid (2 mols) in such a way that practically no chlorine is contained in the HCl gas which issues.

840 g. of phosphorus trichloride (6.1 mols) and the catalyst mentioned in the table below are then added and 460 g. of chlorine (6.5 mols) passed in in the following sequence:

200 g. at about 40 to 60° C.,
150 g. at about 60 to 70° C. and
110 g. at about 70 to 80° C.

The issuing gas must be free of chlorine; the temperature is increased in such a way that the evolution of HCl does not become too strong. The mixture is slowly heated until the reflux temperature has been reached. After completion of the HCl evolution the mixture is kept for further two hours under reflux and worked up as described in Example 1. The yields obtained are given in the following table:

| Catalyst | G. | Yield (tetrachloropyrimidine), percent |
|---|---|---|
| Trimethylamine | 3.5 | 91.5 |
| Triethylamine | 5 | 95 |
| Tripropylamine | 7 | 95 |
| Tributylamine | 9 | 94 |
| N-methylpyrrolidine | 5 | 94 |
| N-methylmorpholine | 5 | 92.5 |
| N-methylpiperazine | 5 | 87 |
| N,N,N',N'-tetrabutylethylenediamine | 10 | 94 |
| 4-methylpyridine | 5 | 89 |
| 4-ethylpyridine | 5 | 96 |
| 4-tert.-butylpyridine | 5 | 90.5 |
| 3,5-diethylpyridine | 6 | 90.5 |
| Isoquinoline | 5 | 91.5 |
| 1-methylimidazole | 3 | 95.5 |
| N-methylbenzimidazole | 5 | 94.5 |
| 4,5-dimethylthiazole | 4 | 88.5 |
| Pyridine plus triethylamine | 2 / 3 | 94 |
| Dimethylformamide plus triethylamine | 2 / 3 | 95.5 |
| Pyridine plus 4-ethylpyridine | 2 / 3 | 94 |

I claim:

1. Process for the manufacture of tetrachloropyrimidine by the action of chlorinating agents on barbituric acid, wherein barbituric acid is reacted in phosphorous oxychloride, in the absence of water, with approximately 2.9 to 3.5 mols of phosphorous trichloride per mol of barbituric acid and approximately 4.0 to 5.0 mols of chlorine at about 20° to 115° C. to give tetrachloropyrimidine.

2. Process according to claim 1 wherein the reaction is first conducted in the presence of chlorine until about 1 to 2 chlorine atoms per molecule of barbituric acid have been taken up and subsequently the reaction is conducted with approximately 2.9 to 3.5 mols of phosphorous trichloride per mol of barbituric acid and about 3 to 4 mols of chlorine per mol of barbituric acid by heating to temperature not exceeding 115° C., wherein the total mols of chlorine per mol of barbituric acid do not exceed 5 mols, to give tetrachloropyrimidine.

3. Process according to claim 1, characterised in that tertiary amines and/or dimethylformamide are used as catalysts.

4. Process according to claim 1 wherein a catalyst is used which is selected from the group consisting of trialkylamines having 1–4 carbon atoms in the alkyl group, pyridine, alkylpyridines having 1–4 carbon atoms in the alkyl group, N-methylpyrrolidine, N-methylmorpholine, N-methylpiperazine, quinoline, isoquinoline, 1-methylimidazole, N-methylbenzimidazole, 4,5-dimethylthiazole, N,N,N',N'-tetrabutylethylenediamine, dimethylformamide and mixtures thereof.

References Cited

FOREIGN PATENTS 1,182,086   2/1970   Great Britain.

ALEX MAZEL, Primary Examiner

R. V. RUSH, Assistant Examiner